Patented June 5, 1934

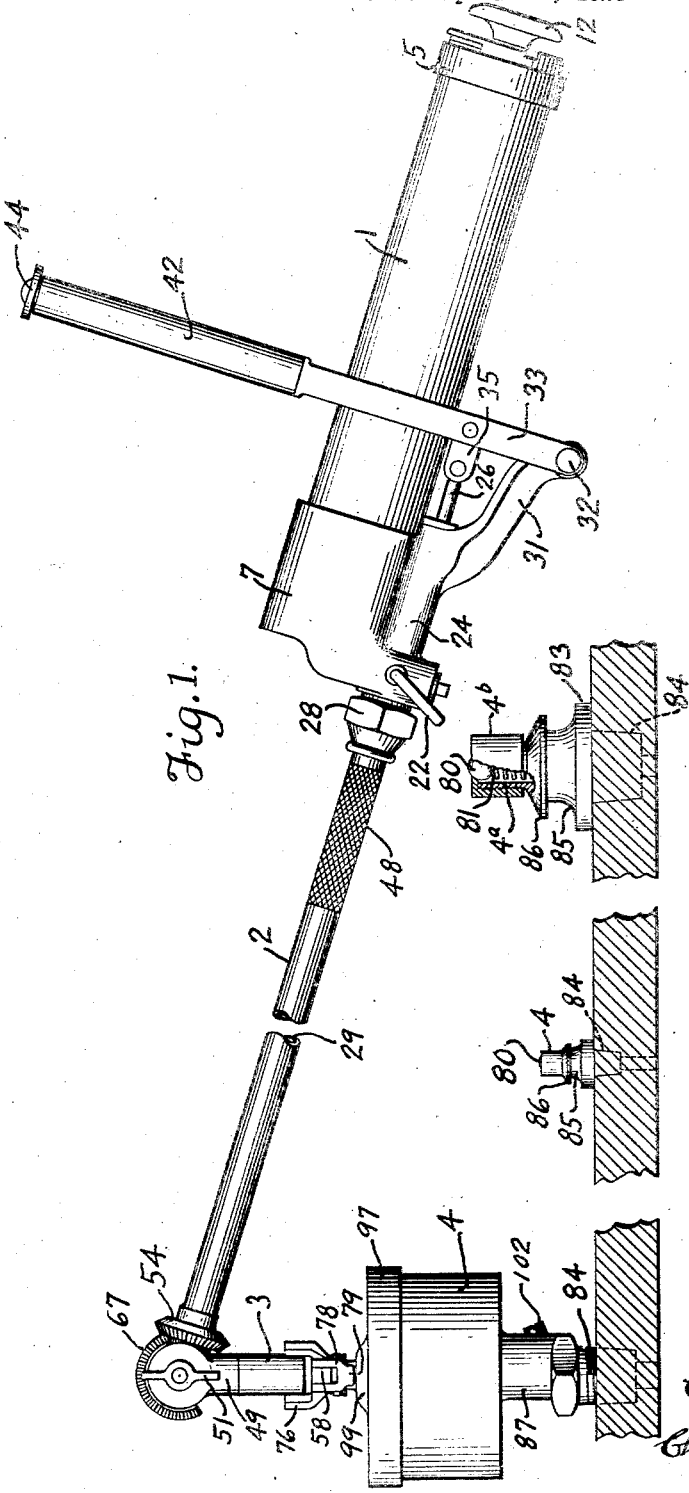

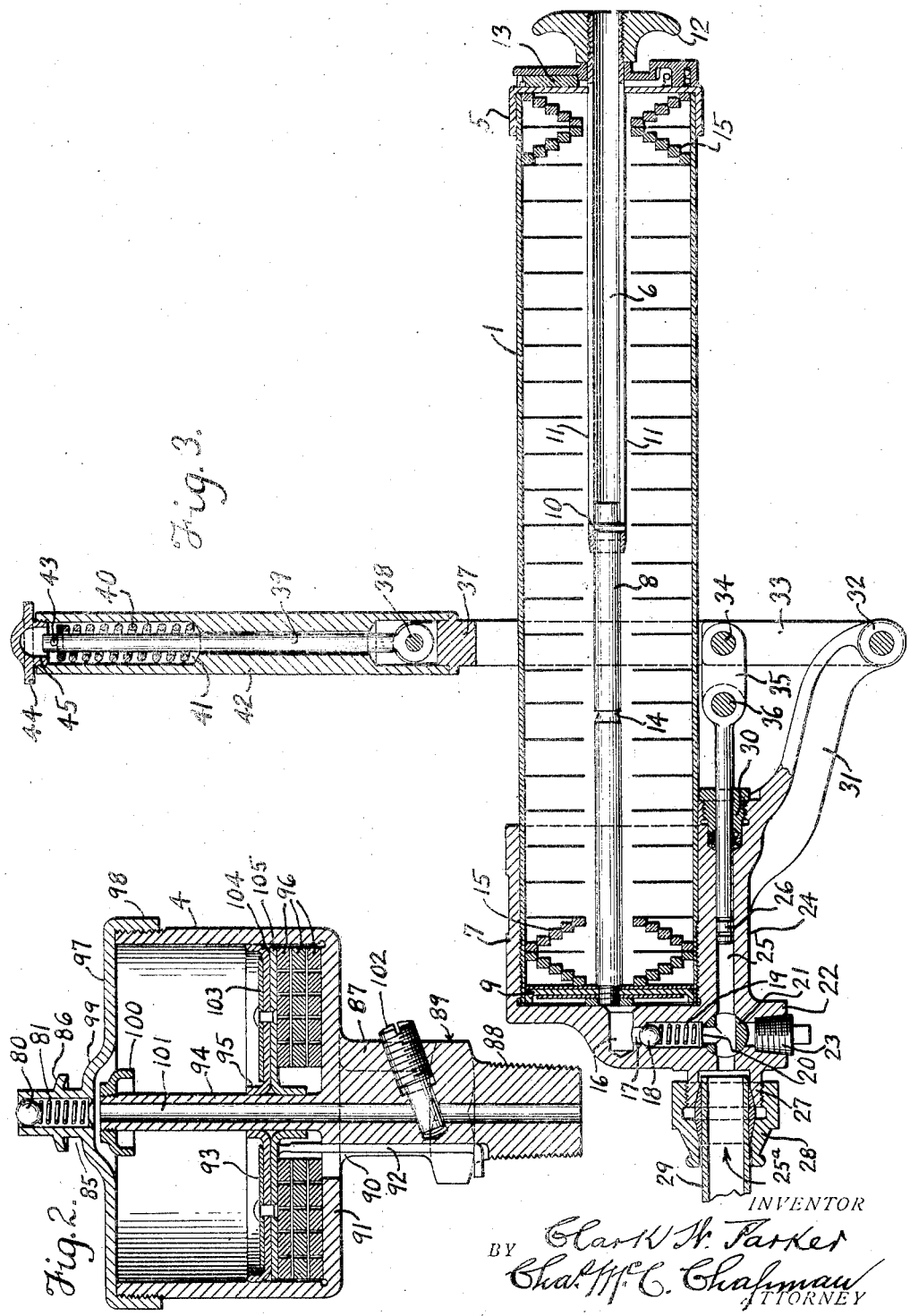

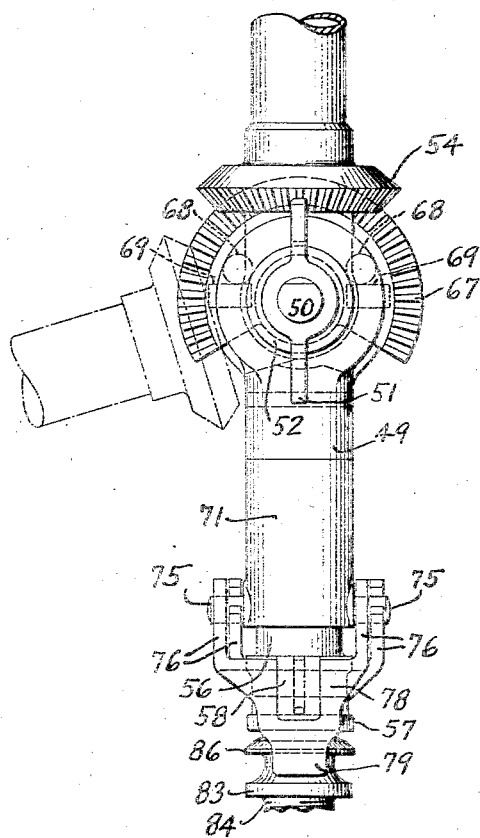

1,961,707

UNITED STATES PATENT OFFICE 1,961,707

GREASE DISPENSER

Clark W. Parker, New York, N. Y., assignor, by mesne assignments, to The Lubrication Corporation, South Bend, Ind., a corporation of Delaware Application April 26, 1928, Serial No. 272,921

4 Claims. (Cl. 221—47.4)

This invention relates to the art of machinery lubrication, and has particular reference to a method of, and system of means for, lubricating the bearings of machinery and the various parts of the latter, the lubricant being supplied under pressure which may vary materially according to the conditions found to exist as the result of use of the machinery, or because of the type of the latter and the parts to be treated.

Heretofore it has been proposed to employ cups, fittings, and holders of various kinds as a medium by which to translate oil, light and heavy grease, and various kinds of lubricants to machinery, bearings or parts requiring oiling and lubrication; but, all these means or devices are either objectionable for various reasons, or are insufficient, ineffective or useless, unless combined with other devices or apparatus capable of holding an adequate quantity of lubricant for continuous and long use, or capable of imposing pressure upon the lubricant at the entrance to the gland, passage or conduit occupied by such cup, fitting or other holder. Oil and grease, under pressure of varying degrees, have been forced into the glands or passages leading to the bearings or parts to be lubricated, by devices such as guns, compressors and boosters; but, the use of all these devices and apparatus is predicated upon the necessity for dislodging congealed, inspissated or solidified lubricant resulting from sand, grit, dust and grindings which accumulates in the holders at the ends of the glands, and can not be either manually or mechanically dislodged without the labor of removing the holder, or employing a high power compressor capable of forcing the said thickened lubricant out of the holder into the gland, through the latter to the bearing, and from the latter to the outside of the machinery. This process results in great involuntary loss of lubricating material, requires tremendous pressure and strain upon the holders and fittings, necessitating the use of expensive tools and apparatus, which are awkward, mechanically weak, often become broken and totally incapacitated, resulting in monetary loss. Furthermore, the known "systems" and apparatus employed for lubricating purposes create a tremendous wastage of lubricant, for which the motor owner pays, and in connection with which the seller thereof is often indifferent. In fact, the present-day lubricating systems and apparatus have no way of gaging either the amount of lubricant in the glands leading to the bearings, the amount of lubricant required to fill the glands, or determining the amount of lubricant which is being supplied, fed or forced into said glands, or the holders,—whatever they may be,— which caps or closes one end of the glands. Furthermore, it often happens that the pressure required, to open a free passage through the holders into the glands, is so great as to destroy the holder, or the means coupled thereto, or some part of the power apparatus employed. This is all very costly, unnecessarily wasteful, and militates against both the car owner and the service station.

I have found, after intensive and extensive study of the various problems involved in machinery lubrication, that, with the proper instrumentalities, approximately perfect lubrication can be obtained, and maintained indefinitely, without wastage of lubricants, without loss of fittings or holders, without breakage of apparatus and, therefore, with very great economy; and that, in connection with road vehicles of the automotive type, it is possible to provide lubricating means which will give and maintain a large and continuous supply of lubricant, of any consistency, under sufficient pressure, thus allowing a wide range of travel or radius of action, which will economize the lubricant, avoid wastage, necessitate comparatively low pressure for supplying the lubricant to the glands and bearings, and which, on the whole, is economical, efficient and highly satisfactory.

The instrumentalities I have chosen, for the purpose of explaining my invention in method and system of means, are effective, economical, easy to manipulate; involve adequate pressure, high or low, for supply of the lubricant; may be caused to impose high pressure when required; may be utilized to deliver the lubricant, regardless of its characteristics, directly and continuously from the supply to the bearings under varying degrees of pressure; may continue the supply indefinitely under pressure; and may be utilized for high pressure when necessary to drive out inspissated lubricant which may be detrimental to the bearings or machinery parts. The many objects of my invention and the details of construction thereof will be made apparent during the course of this description and, as helpful thereto, I have provided drawings wherein:

Figure 1 is a view in side elevation of a combination of apparatus constituting a system of means embodying my invention and employed in my method of lubrication, the conduit being broken away centrally and parts of the machinery, through which the glands run to the bearings, being shown in section and broken away to convey an idea of the extent thereof; and in one of the parts a grease cup is applied and in the other a fitting is applied, it being understood that my coupling may be applied to any form of holder acting as a closure for the inlet end of the gland;

Figure 2 is a central, vertical, sectional view of a grease cup form of holder or gland closure embodying my invention;

Figure 3 is a longitudinal central sectional view of a supply means in the form of a grease gun, or compressor and booster combined, embodying my invention, a portion of the hose and coupling means therefor being shown connected to the delivery end of the gun;

Figure 4 is a view showing the conduit and coupler in side elevation, the conduit being broken away due to the length thereof and the limitations of the sheet, the lower end of the view including a part of a fitting or holder, and the whole embodying my invention; and Figure 5 is a view in sectional elevation of the structure shown in Figure 4.

Referring to the drawings, and particularly to Figure 1, it will be seen that the broad essentials of my system of means are a source of supply 1, conduit 2, coupling means 3, and holder 4. The supply means is in the form of a gun with a high-pressure booster, Figure 3. The conduit is a long, metal, rigid hose carrying a swivel member, and a sheath having an actuating gear, Figures 4 and 5. The coupling means comprises a swivel-member, actuating collar and snap-on coupler, Figures 4 and 5. The holder may be in the form of a fitting, Figures 1, 4 and 5, or a grease cup, Figures 1 and 2, or any other suitable form of receptacle capable of closing the inlet end of a gland, holding a desired quantity of lubricant and acting as a seal against dust, grit or other particles which would cause a thickening of the lubricant. These four essentials of my system of means are specially constructed to enable my method of lubrication to be carried out effectively, economically and with certain variations dependent upon the type of machinery treated and the purposes of the treatment. It will be understood that the foregoing essential parts may be very greatly modified in form, shape, structure and size, within the scope of my invention, and that the details of construction of said essential parts, shown in the accompanying drawings and described herein, are not to be taken as limitations of my invention except as hereinafter claimed; but, are to be understood to be merely exemplifications of my invention which is susceptible of many modifications within the scope of the claims hereto appended.

Referring now to Figure 3, it will be seen that my lubricant supply means comprises a cylindrical shell 1, the outer end of which has permanently applied thereto a cap 5, which overlaps the end of the cylinder and through a central aperture in which the tubular part 6 of a piston-rod operates, as hereinafter described. The delivery end of the cylinder 1 is externally screw-threaded and, applied thereto, by screwing thereon, is the frame member 7 of a booster carried externally by the shell 1. The booster frame is also a closure for the delivery end of shell 1. The tubular part 6 of the rod is telescoped by the solid part 8 which carries at its delivery end a piston 9 threaded upon the rod. The piston 9 may be of any suitable form or construction, the details of which are not material to my present invention. The booster frame 7 may be removed when it is desired to fill the shell 1 with lubricant, this being accomplished by inserting the open end of the shell in a tub of grease, which is sucked into the shell by pulling the piston back to its limit. The rod 8, at its outer end, carries a pin 10 which extends transversely thereof and through the inner end of the tubular part 6 of the rod, said pin sliding longitudinally of the latter in the diametrically opposite longitudinal slots 11 which extend to within a short distance of the outer end of the said tubular part. Externally, at its outer end, the part 6 is screw-threaded for the application of the handle 12, by which the telescopic piston-rod may be manipulated. The cap 5 of the shell 1 carries a spring-controlled locking device generally indicated at 13, which is adapted to cooperate with the circumferential groove 14 approximately midway the length of the rod 8, when the latter is drawn outwardly to its fullest extent in filling the gun with grease. The interior of the gun, between its outer end and the piston, is supplied with a plurality of springs 15 for the purpose of imposing pressure upon the piston to cause the latter to constantly and continuously force the grease in the gun through the various passages, as hereinafter explained, to and through the holder 4. When the gun is filled with grease, the springs are compactly compressed with power stored therein, and the piston is at its outer limit within the shell, and the piston will be so held until the frame 7 has been applied to the shell and all the parts are in condition and ready for a functional operation.

The frame 7 is provided with a central bore 16 opening into the shell 1 for the reception of grease from the latter, said bore being provided with a lateral passage 17, the outer end of which is formed into a seat for a ball-valve or back pressure seal 18, normally held to its seat by a spring 19, sustained at its outer end upon a supporting device 20 within the spring chamber. The spring chamber is expanded into a cylindrical chamber adapted to receive a three-way valve 21, cylindrical in form, and adapted to be rotated or operated by the handle 22 (see Figure 1) extending from the outer end thereof. The valve chamber is continued to the outside of the frame 7, terminating in an enlargement or hub 22$^a$, in which is inserted a plug 23, through the passage occupied by which inspection of the valve may be obtained and through which both the valve chamber and spring chamber can be cleaned. The frame 7, at one side thereof, is provided with a longitudinal, cylindrical enlargement 24 having a passage therethrough, constituting a chamber in which the booster piston and rod 26 operate, the passage 25 being continued through the valve chamber and the externally screw-threaded nipple 27, to which may be secured, by a suitable coupling 28, one end of the hose 29 forming part of the conduit 2. The booster rod works through a stuffing-box 30 at the outer end of the passage 25, and the cylindrical member 24 is extended into an outstanding arm 31 forming a pivotal support at 32 for a lever 33 of the second order, which is connected at 34 to a link 35, in turn connected at 36 to the outer end of the booster rod. The lever 33 is in the form of a yoke which surrounds the shell 1, and the free end 37 of the lever 33 has pivotally connected to it at 38 a rod 39, the outer end of which is surrounded by a spring 40 held in the chamber 41 of the handle 42 by a pin 43 extending transversely of the rod 39 at its outer end. A cap 44 is applied to the outer end of the handle 42, being threaded into said handle by a short extension or neck portion 45. This construction enables the handle 42 to be shifted at a right-angle to the lever 33 by pulling longitudinally upon the handle and separating the latter from the lever at 37, and then turning the handle and rod 39 upon the pivot of the latter at 38, thus placing the handle in parallelism with the gun 1 ready for packing, storing and transportation. The elongation of the lever 33 by the handle 42 affords a greater leverage to be imposed upon the booster, enabling the latter to exert powerful force upon the column of grease to be driven through the hose or conduit 29.

Referring to Figures 4 and 5, it will be seen that the conduit is composed of a sheath 46 encasing the hose 29 and extending from the nut 28 to the swivel member 47 of the conduit. The sheath 46 is provided with a knurled portion 48 by which it may be turned upon the conduit for the purposes presently described. The hose 29 terminates at the swivel member 47, which enters the swivel member 49, the two being provided with tapering interacting surfaces by means of which the two swivel members are enabled to have a relative turning movement, the one within the other, and are adapted to be drawn more or less tightly together through the medium of a screw-threaded extension 50 on the member 47 on which fits a wing-nut 51 which operates against a washer 52 spanning the aperture in the member 49 whereby, when the nut 51 is turned, the member 47 will be either eased or tightened within the member 49. A nipple 53, on the member 47, is secured in the outer end of the hose 29, and the sheath 46, at its outer end, carries a bevel gear 54 which is rigidly applied to the sheath to be turned therewith. The member 49 is provided with a tubular, reduced extension 55, the outer end of which is externally screw-threaded for the reception of the internally screw-threaded tubular portion 56 of a chambered coupling member 57 having two oppositely extending apertured lugs 58 and 59. The swivel members 47 and 49 are shouldered or offset from their tubular extensions and, when fitted together, provide a joint which is strong, flat and the members of which are intimately related for the purposes hereinafter described. The passage 25 through the booster cylinder is continued at 25ª through the hose or conduit 29, and longitudinally through the member 47 at 25ᵇ and then laterally into the hub of the member 47 at 25ᶜ, and thence longitudinally of the member 49 and its extension 55, as at 25ᵈ. The latter passage terminates in the coupling member 57, and the outer end of the extension 55 is provided with a seat for the ball-valve 60, which is normally sustained in sealing position against its seat by the spring 61 supported on a flange in the valve chamber of tubular portion 56 of the coupling member. The valve and spring chamber of the coupling member is extended through a narrow passage into a socket for the reception of the nipple, or cylindrical body portion, of the fitting shown in Figures 1, 4 and 5, details of which will be presently described. The socket of the coupling member 57 is provided with a compressible gasket 62 which seats against the flange which supports the valve-spring 61; and the passage from the valve chamber into the socket is continued undiminished through the gasket 62, and merges into the said socket which is deep and twice the diameter of said passage. The swivel member 47 has the passage 25ᶜ in its hub portion extended outwardly through its wall, and at this point the said passage is screw-threaded for the reception of the threaded end 63 of the screw, the body of which is enlarged at 64 and made smooth, and at its extreme outer end is provided with a slotted head 65 for the reception of an instrument. The body 64 of the screw affords a journal bearing for the hub 66 of a beveled segmental gear 67, which is maintained in position by the head 65 of the screw, but is free to turn on the body of the latter under impulse from the gear 54. As seen in Figure 4, the bevel segmental gear 67 has extending from its outer surface two diametrically opposite pins 68 which are adapted to engage the outturned terminal ends 69 of a forked arm 70, the prongs of which fork embrace the hub 66 of the bevel gear 67. Thus, as the said gear is oscillated or turned in one direction or the other, one or the other of its pins 68 will engage with one or the other of the prongs of the forked arm 70, which is the angular terminal member of the extensive collar 71 internally flanged at 72 and surrounding the tubular extension 55 of the swivel member 49. The internal flange 72 offsets the collar 71 from the extension 55 sufficiently to enable said collar to surround the threaded extension of the coupler 57 and leave between the end of the latter and the said flange a chamber 73 in which a coiled spring 74 is housed, and which surrounds the extension 55. Thus, while the collar 71 is normally maintained in snug engagement with the swivel member 49 by the spring 74, the latter will permit, by compression, the collar 71 to be slid longitudinally upon the extension of the coupler 57. Viewing Figure 4, it will be seen that the collar 71 is provided with diametrically opposite outwardly extending pins 75 which play within the bifurcations of the inner arms 76 of coupling levers pivoted at 77 to the lugs 58 of the coupling member 57. The outer arms of the coupling levers are slotted at 78 to embrace the lugs 58 and have their terminal ends formed into hooks 79 inturned to engage the fitting as presently described.

It will now be understood that when the sheath 46 is turned slightly, the bevel gear 54 will be rotated, in turn rotating the bevel gear 67, one of the pins 68 of which, according to the direction of rotation, will engage a terminal end 69 of the arm 70, thus, shifting the collar 71 longitudinally of the swivel member 49 and compressing the spring 74, storing power therein. Such movement of the collar 71 shifts the pins 75 within the bifurcations of the inner arms 76, thus shifting outwardly the hooked ends of the coupling levers to release the hooks from engagement with the fitting. Upon releasing the sheath 46, the spring 74 will return the collar 71 to its normal position, causing the terminal ends 69 of the arm 70 to operate upon the pin 68, which in turn reversely shifts the gear 67 and the gear 54 and the sheath 46. The movement in either direction is both easy and slight; and the operation just described will be carried out and easily effected regardless of the position to which the coupling has been shifted relatively to the conduit. It will be seen, therefore, that, regardless of the position of a fitting on any part of a machine, the coupling can be quickly and easily applied and released by a short, easy turning movement of the sheath 46. This eliminates the use of a second hand in adjusting the coupling to the fitting and the inconvenience of reaching into small spaces and difficult positions for the purpose. My rigid conduit also avoids the necessity of supporting the hose (usually flexible or provided with loose, uncontrollable joints) with one hand, while holding the gun, compressor or supply means in the other, in an attempt to connect the coupling to the fitting; for, my swivel joint 47—49 can be set, with any desired degree of rigidity, in the exact position, or at the exact angle, desired as a preliminary to coupling the conduit to the fitting or grease holder. When so set, the operator can accurately direct the coupling, with one hand upon the gun to the spot, regardless of how difficult of access, where the fitting or holder is set and, by slight pressure from the gun-end, snap the coupler upon the fitting and then pump in the grease, or allow the gun to automatically supply the grease. And, after the coupling has been thus applied, if the gun is not in a convenient or easy position for operation, a slight pressure upon the gun, overcoming friction at the joint 47—49, will enable the gun to be shifted into any position for operation. All these manipulations are by one-hand gripping the gun 1, and offer no impediment to the free passage of the lubricant through the system. In Figure 4, I have shown in full lines a position of the various parts wherein the passages 25ª and 25ᵈ of the conduit are in axial alinement. In the dotted line sketch, I have shown a position of extreme adjustment on one side of the axis of the coupling. An adjustment to the same extent can be made on the opposite side of the longitudinal axis of the coupling, as will be readily seen. By turning the wing nut 51, the ease or freedom of movement of the swivel members can be regulated and adjusted, and this feat can be accomplished at any time regardless of the position of the parts relatively to each other and without congesting or changing the diameter of the various parts of the passage through the conduit from its attachment to the gun to its attachment to the fitting. It will also be seen that the movement of the sheath 46 required to manipulate the coupling levers is slight, a very slight movement either way of the said sheath giving a comparatively extensive movement to the gear 67, resulting in thrusting the collar 71 longitudinally a sufficient distance to either release the hooks 79 from the fitting or engage said hooks with the fitting. On the other hand, it will be seen that mere pressure of the hooked members upon the fitting, as presently described, will enable the said members to snap over the fitting and firmly clutch the same. This movement means that the bifurcated ends of the lever arms 76 will operate upon the pins 75 of the collar 71, shifting the latter longitudinally, causing compression of the spring 74 and separation of the extensions 69 of the collar arms 70 from the pins 68 carried by the bevel gear 67. This is all independently of the sheath and its movement. The subject matter hereinabove described relative to the conduit and coupler is described and claimed in my divisional application Serial #610,473, filed May 10, 1932.

Referring now to Figures 1 and 2, the structure of the grease cups or holders will be readily understood. Present-day industrial conditions, with reference to lubrication, are peculiar and somewhat anomalous, in that industrial machinery in most instances employ grease cups of large capacity,—some very large,—others comparatively small. On the other hand, road vehicles of the automobile type, while actually requiring grease cups of large capacity are, nevertheless, in the vast majority equipped with devices which are mere caps or closures for glands leading to the bearings, or have little or no holding or reserve capacity, these devices being frequently referred to as "fittings". Some of these fittings are called "pin-fittings", because provided with oppositely extending pins adapted to cooperate with slots in a coupling member forming a bayonet joint. A large percentage of automobiles are provided with such fittings and, in most instances, the various types of fittings are objectionable because dust, grit and sand readily penetrate the same, combine with the lubricant and stiffen and solidify the latter to such an extent as to require very high pressure to open the valves for the introduction of clean lubricant. It is too laborious to remove the fittings, and in some conditions it is often impossible. In any event, it requires so much time to replace the fittings that operatives prefer to use a high pressure gun or compressor to force open the valve, force the stiffened lubricant through the gland to the bearing, and from thence through any openings, crevices, cracks or other points of escapement until the bearings and glands and fittings have been thoroughly supplied with clean and fresh lubricant. This is expensive and wasteful, and besides is a very difficult operation, as is understood by all those skilled in the art. It is among the objects of my method and system of means of lubrication to eliminate all these objections, and many others which are well known to the trade and users of machinery of all kinds.

In Figure 1, I have shown a plurality of grease cups, indicated by 4, and the showing made is for the purpose of conveying the fact that the machinery, whether industrial or vehicular, may be provided with both kinds or various kinds of grease cups, large and small, controlled by either exigency or desire, or position of use, or accessibility or inaccessibility of location. In the middle of Figure 1, the grease cup shown is small and of the fitting type. This fitting is also shown partially in Figures 4 and 5. Specifically, it consists of the upper, smooth and extended body portion or cylindrical barrel 4, the inlet end of which has an inturned flange providing a central, internal seat for a ball-valve 80, said valve being held to its seat by the spring 81, one end of which supports the ball and holds it to its seat with predetermined pressure. The other end of the spring 81 is supported upon an inturned flange 82, or a plurality of spurs, which may be turned up from the metal of the barrel. By inverting the fitting, the ball may be dropped in place and then the spring, by engaging one end thereof with the flange or spurs 82 may be spun into place. The fitting is provided with a circumferential flange 83 which may be made angular, if desired, for application of a wrench, and below the flange the barrel of the fitting is externally screw-threaded, as at 84 for insertion, in the usual manner, in the usual tapped opening at the end of the gland or passage leading to the bearing to be lubricated. The barrel portion 84 may be smooth, if desired, and driven or wedged into place. The fitting above the flange 83 is provided with a circumferential groove 85, the bottom of which terminates at the circumference of the flange and the top of which is formed by the slightly inclined bottom of the skirt 86, the top of which latter is slightly convexed from the circumference of the barrel or body portion 4 to the circumference of the skirt. Thus the fitting is provided with a groove the shape of which corresponds with the hooked ends 79 of the lever arms 78; but, said groove is sufficiently larger than the said hooked ends 79 to enable the movement of said ends relatively to the skirt 86 to both release and engage the latter automatically or otherwise. The hooks will, under sufficient pressure, slide down the convex outer surface of the skirt 86 and snap under the same by freely entering the groove 85. My grease cup of "fitting" type is of large capacity, since it has a large chamber of uniform diameter from end-to-end, occupied by the spring and valve only. It, therefore, can hold in reserve a large quantity of lubricant, is not liable to become choked, and does not require high pressure to unseat its valve and force the lubricant therethrough. My cup is very strong, simple and has no separable parts, outstanding therefrom, to be lost or broken.

Viewing Figures 1 and 2, it will be seen that the grease cup of large capacity has a smooth cylindrical body portion 4, reduced cylindrical stem 87, the latter being provided with a reduced screw-threaded portion 88 adapted to be applied to the tapped opening at the end of the gland of the machinery to which the grease cup is applied. The stem 87 is provided with an angular portion 89 for the application of a wrench. The stem 87 also has in one side a longitudinal slot 90 which extends through the nut portion 89 and also through the bottom 91 of the cup. This slot is for the reception and movement of the gage 92 which is secured to the bottom of a piston 93 operating within the cup. The position of the piston is indicated by the gage 92, which in turn indicates the amount of lubricant in the cup. The bottom 91 of the cup has a centrally located, internal, tubular post 94, which is surrounded by the journal 95 of the piston, and on which the latter is adapted to slide under the impulse of the springs 96 which are nested or superimposed between the bottom of the cup and the piston. As shown in Figure 2, the springs are compressed to the fullest, power being stored therein, with tendency to move the piston outwardly in the cup to force the grease contained in the cup with great power against the cap 97 thereof, which is held to the cup by the internally threaded flange 98 cooperating with the threads at the outer end of the cup. The cap 97 has a central, outwardly bowed portion 99 from which extends an integral fitting in essential particulars the same as the fitting shown in Figures 4 and 5, and at the right of Figure 1; that is to say, it has the groove 85 for the reception of the hooks 79 of the coupling levers 78, and said fitting has the skirt 86 over which the coupling hooks slide and under which they hold, and said fitting also has the ball-valve 80 and supporting spring 81. The outer end of the post 94, within the grease cup 4, has secured thereto in any suitable manner a spreader 100. The spreader should be removable from the post so as to enable the piston to be removed and replaced. The exterior of the spreader conforms with the interior of the bowed portion 99 of the cap of the grease cup, and the location of the spreader is sufficiently close to the bowed portion 99 of the cap to provide only a narrow passage between the two for the passage of grease, as presently described. The passage 101 through the post 94 and the stem 87 is continuous and uniform and communicates with the passage or gland in the machinery leading to the bearing to be lubricated. The passage through the fitting, provided on the cap of the cup, may be either greater in diameter than, or of the same diameter as, the passage 101; and it will be noted that the latter may be interrupted by the screw-threaded plug or valve 102 extended through the stem 87 and across said passage 101, as clearly shown in Figure 2. The valve 102 is merely suggestive and may be of various other suitable forms. The application of the fitting of the form of Figures 4 and 5 to the grease cup of the form of Figure 2 has a very valuable function which will be presently described; but, it will be understood that said fitting may be either integral with the cap 97 or separate therefrom and detachably secured thereto in the same manner that said fitting is detachably secured to the machinery, as shown in Figure 1 at the right thereof.

The piston is preferably of compound structure, consisting of a circular, flat plate 103, a flexible, cup-shaped washer 104 and a flat flanged plate 105, these three members being preferably riveted together. The flexible washer is provided with a circumferential flange which is outturned toward the cap of the cup, and is also provided with an outturned flange at its apertured center closely surrounding the post 94. The plate 105 is also provided with an outturned flange at its central aperture closely surrounding the post 94. The two central flanges of the piston provide the journal 95 of the latter. The gasket or cup-shaped washer 104 being of flexible material will be influenced by the pressure imposed upon the body of grease within the cup, and that pressure will force said circumferential flange against the walls of the cup and its central flange against the surface of the post, thus making a grease-tight fit preventing any of the lubricant reaching the bottom of the cup or the springs therein.

Having thus described my invention, in the matter of its mechanical details, I will now describe my method of lubrication involving the system of means which I have chosen to demonstrate the method, it being understood that, so far as the method is concerned, I am not to be restricted to any specific construction of the essential system of means. Assuming a piece of machinery is to be lubricated in the matter of its many bearings, some of which are difficult of access, and assuming said machinery to have applied thereto, as a closure for the outer ends of its glands, a fitting such as shown at the right of Figure 1, and in Figures 4 and 5, and assuming that the grease gun of Figure 3 is loaded with grease and has the hose of Figures 4 and 5 applied thereto, the following will be understood: If the grease is not congealed or stiffened in the fitting or in the gland, it is only necessary to snap the coupling onto the fitting, and this can be done regardless of the position of the fitting on the machinery, and regardless of the angle of approach thereto. The angle of approach may be difficult, as in Figure 1, or it may be a comparatively straight approach, as in Figures 4 and 5, in which event the coupling can be snapped on by a straight outward thrust. In Figure 1, the coupling will be snapped onto the fitting by pressure upon the solid hose at an angle to its length. It will be seen that, regardless of the angle of approach, the long body of the fitting, beyond its skirt 86, enters the deep socket of the coupling, and the two devices immediately cooperate to cause the further approach of the coupling to the fitting to be in absolutely right lines regardless of the angle of the gun and hose to the coupling. This is important since thereby the two hooked ends of the yielding arms 78, are caused to ride down the inclined surface of the skirt 86 and simultaneously snap thereunder, thus making a quick and accurate coupling. These features of construction are equally important in uncoupling the parts; for, the parts, as shown in Figure 5, can only be separated by first turning the sheath 48 or shifting the collar 71 longitudinally, causing the hooks 79 to recede from the skirt 86, and then drawing the coupling in a right-line away from the fitting. There is, then, no lagging of the parts nor detention of the hooks. When the fitting is connected to the coupler, the gasket 62 will be compressed and the seal between the parts will be tight against the passage of lubricant; and as there can be no relative angular movement between the coupled parts, the seal is perfect at all times during use. On the other hand, the swivel joint 47—49 between the coupling and hose enables movement of the hose and gun relatively to the coupler and fitting without disturbing the passage of lubricant or putting strain upon the coupled parts. These various functions and advantages are important and upon them I desire to lay stress in connection with both the mere "fitting" and the grease cup of Figure 2.

Instantly the coupling is applied to the fitting, the valve 21 is opened, permitting the passage of grease from the gun past the seal 18, through the valve 21, through the passage 25ª in the hose, the passage 25ᵇ and 25ᶜ and 25ᵈ of the swivel members, past the seal 60, through the gasket 62 in the coupling, and past the seal 80 of the fitting, and into the chamber of said fitting and through the latter into the gland of the machinery and to the bearing of the latter. If there is an impediment at the fitting which cannot be overcome by the normal pressure of the piston of the gun, which is automatically feeding the lubricant, the booster 26 may be given a quick movement by manipulating the lever 33 through the medium of the handle 42, without shifting the latter to the position of Figure 3. The booster imposes very high pressure upon the column of grease extending through the valve 21 and backing into the chamber 25, and that pressure is transmitted throughout the system to the chamber of the fitting, the valve 80 of which is readily opened thereby. Free passage to and through the glands for the lubricant is thereby initially started. The remainder of the filling operation is conducted automatically by the gun-piston under spring pressure and without aid of the booster, though the latter may be continued in operation long as desired. On the other hand, if it is found that the pressure of the gun-piston is insufficient to automatically, continuously and uniformly feed the lubricant to the bearing, and if it be found that unusually high pressure is necessary to force the seal in the coupling and fitting, the lever handle will be shifted to the position of Figure 3, and a few movements of the plunger will be found ample for the purpose of breaking the seal, and forcing the thickened grease through the glands and bearings, whereupon the spring-forced piston of the gun will continue the greasing operation automatically. Thus, with reference to greasing a car or road vehicle, it will be seen that I have provided a system of means by which the greasing operation is carried out with little or no labor and practically automatically from start to finish. This is particularly true with my type of fitting herein shown, since the spring pressure 81 against the ball valve 80 will be sufficiently great to maintain the said valve in sealing position against the admission of dust, grit, sand or other foreign substances, which now give so much trouble to car owners because of the inadequate seal of the pin fitting of the Alemite type and the inadequate seal of the fitting of the Zerk type. Moreover, with my type of fitting, the spring and valve chamber is sufficiently large, together with the stem portion of the filling, to constitute a real grease cup of large holding capacity in comparison with the fittings of the Alemite type and of the Zerk type. Thus, a wide range of travel is permitted the car without renewal of lubricant, and it is wholly unnecessary to so frequently, as is now necessary, renew the lubricating operations. These are important advantages and factors of my lubricating system and method, and upon them I desire to lay stress.

The foregoing advantages are very greatly accentuated in the use of a large grease cup of the type shown in Figures 1 and 2, since the capacity thereof may be increased according to the requirements of the owner of the machinery; that is to say, by the use of my invention on industrial machinery, lubrication becomes infrequent, and by the use of my invention on automotive vehicles, the range of action or travel is greatly increased. Further advantages of my large capacity grease cup system of means and method of lubrication will be readily understood from the following description:

With the grease cup of Figure 2 in position on the machinery, stationary, industrial, or motive, and assuming the cup 4 to be filled to capacity,—that is, with the piston fully depressed, as shown in Figure 2,—and assuming the adjustment of the valve 102 for the purpose of permitting the passage of lubricant in desired volume, the springs 96 will automatically expand and the lubricant will be automatically forced against the cap 97, which will in turn force it to the chamber or passage between the enlargement 99 of the cap and the spreader 100; and thus the grease will be forced through the passage 101, into the gland of the machinery, and to the bearing to be lubricated. This automatic feed of the lubricant will be continuous and uniform until the volume in the cup is completely exhausted and the piston has reached its extreme of movement into contact with the cap of the cup. This is a highly desirable mode of operation, since the user can be always assured that his bearings are being continuously lubricated; and the gage 92 will apprise him, upon a casual inspection of the various grease cups on his machinery, whether the said cups require replenishment. Hence, the bearings will never be without lubricant. A great advantage of this grease cup system of lubrication is that there is always a solid body of grease within the fitting of the cap, and under the cap, and between the latter and the spreader 100. This prevents any possibility of grit, dirt, sand or other foreign substances from penetrating the fitting on the grease cup; and the grease within the cup plus the spring holding the ball to its seat make it impossible for the ball to give way to the passage of foreign substances. Assuming the extreme case of a foreign substance penetrating the fitting on the grease cup, such substance can never get into the glands of the machinery and thus pass to the bearings to their detriment, because the cap 97 can readily be removed at any time for inspection and cleansing purposes, and because the chance is quite remote that any such foreign substance would ever get into the passage 101 of the post 94. It would be more likely to be deflected by the spreader to the surface of the grease in the cup from which it could be readily scraped, thus avoiding any possibility of passage to the bearings and injury to the latter.

Assuming the grease cup to be empty and the piston to be pressed against the cap 97 under the power of the springs 96, the filling operation will be as follows: Regardless of the position of the grease cup on the machinery, or how difficult of access the same may be, the snap-on coupling can be applied to the fitting on the cover of the grease cup either by a direct thrust, if the members of the hose and coupling are approximately in alinement, or by angular pressure upon the hose if the approach to the fitting requires an angular adjustment of the coupling relatively to the hose. The valve 21 will now be opened to allow the lubricant to be fed automatically through the conduit to the holder, the seal 80 yielding readily to the superior pressure of the springs 15 of the supply means. If greater pressure is required to unseat the valve 80, the booster 26 may be manipulated by the lever 33; but, in the majority of cases, the booster will not be needed. In the beginning, the valve 102 will be adjusted to entirely clear the passage 101 and allow free progress of the lubricant to the glands and bearings of the machinery. When a predetermined amount of grease has been supplied to the bearings, the valve 102 will be adjusted to entirely close the passage 101, thus causing the lubricant to regurgitate in the passage 101, and overflow the spreader 100 and, in the continuous feed from the gun, the lubricant will be distributed by the spreader laterally into the space between the piston and the cap 97. The springs 96 will gradually yield, being weaker than the springs 15 in the gun 1. Conditions will be indicated by the gage rod 92, and should the springs 15 of the gun prove insufficient to completely fill the cup, the lever 33 will be operated to boost the grease through the conduit. Thus the supply to the cup will be continued until it is entirely filled, and the springs 96 are completely compressed, as indicated by the position of the gage 92. The valve 21 will then be closed. At this time a slight rotary movement of the sheath 46 upon the hose will release the coupling members 79 from the skirt 86 of the fitting, whereupon the ball-valve 80 will seal the entrance to the fitting and the ball-valve 60 will seal the chamber of the coupling. This is all automatically carried out and requires neither care nor attention on the part of the operative, who knows that, when he thus releases his gun from his grease cup, the latter will be sealed as well as his gun to prevent exudation and loss of lubricant. The valve 102 will now be adjusted to provide the requisite passage of the grease through the conduit 101, according to the speed with which it is desired that the bearings shall be supplied with lubricant. Additionally, the seal 18 will automatically close the passage from the gun so that there will be no wastage or excessive supply to the hose. Of course, if it be desired, the filling operation can be carried out expeditiously by the use of the booster 26. And it is to be particularly noted that the booster lever is of the second order, enabling the power pressure to be applied by a direct thrust longitudinally of the gun and in the direction of the machinery being lubricated. This is important, since it avoids pulling and jerking strains upon the conduit and holders.

The control valve 21, at the gun, is important; for, it enables the supply of lubricant to be cut off at the gun avoiding wastage, relieves pressure in the conduit and coupling, avoids leakage, and prevents the booster from functioning should the lever be accidentally actuated or fooled with.

The solid hose with a single swivel joint, which can be so manipulated as to render the entire conduit rigid, is of importance, since the apparatus may be more easily controlled and can be manipulated with one hand for coupling purposes and can be directed with facility to the point of use, regardless of the angle of approach. Strength, economy and durability are also characteristics of importance. The single joint is also of such structure as to allow a wide range of adjustment of the coupler relatively to the hose, and such adjustment can be made quickly by pressure upon the coupling.

The structure of the snap-on coupling is of great importance, since it avoids handling the same for coupling purposes; can be automatically applied; can be quickly uncoupled by a slight movement of the sheath 46; which may also be used for applying the coupler; and can be quickly and easily manipulated regardless of the position of the holder or the difficulty of approach thereto, because the sheath 46 is adjacent the end of the gun.

The grease cup, of Figure 2, adds greatly to the method of lubrication, since it can be filled while in place without removing any of its parts; affords a clear passage from end-to-end for filling and feed purposes; automatically feeds lubricant to the bearings; maintains a continuous regulated supply; permits supply to bearings before its reservoir is filled; and has a tell-tale or indicator for its contents.

It will now be apparent that I have provided a method of lubrication which involves the use of varied instrumentalities, and that the gun, hose, coupler and grease holders shown in the drawings are merely expedients by which to carry out my method. The gun 1, which is shown in Figures 1 and 3, is not to be taken as a limitation of my invention, although it contains novelties of construction and mode of operation which are helpful in carrying out my method. The hose and coupling and the various forms of grease holders shown in the drawings are merely incidents to my method, although all of these devices have novel features of construction which are important. The large grease cup or lubricant holder shown in Figures 1 and 2 is important, because it provides means for automatically feeding the lubricant to the machinery, has a tell-tale to indicate the amount of lubricant in the cup, and can hold such a large quantity of grease that a wide range of travel of an automobile is permitted without renewal of lubricant. Various forms of fittings, such as shown in Figures 4 and 5 and in the middle of Figure 1, which embody an actual reserve chamber for holding lubricant, permitting a wide range of travel of the automobile, can be employed; and at the extreme right of Figure 1 I have shown another form of fitting which may be employed and which may be made considerably larger than that shown in the middle of Figure 1. In this form the body of the fitting is made in two parts, the barrel 4ª being externally screw-threaded and entirely open at its outer end, and the cap 4ᵇ being in the form of a surrounding sheath internally screw-threaded and provided at its outer end with an aperture surrounded by a valve-seat, against which the ball-valve 80 is pressed by the spring 81. The other parts of this fitting are similar to that shown in Figures 4 and 5, and its features are indicated by the same reference characters. The nipple 84 may be smooth, to wedge into place, or may be threaded, to screw into the usual tapped aperture at the outer end of the gland leading to the bearing.

Having thus described my invention, what I claim and desire to secure by Letters Patent is:

1. A system of means for lubricating machinery, a lubricant container, a conduit connected with the container, means for continuously imposing pressure upon the mass of lubricant in the container and for driving said mass through the conduit in a continuous stream, means for imposing additional pressure upon said stream to overcome resistance to the flow thereof through said conduit, and means for regulating the flow of said stream as it passes to the machinery, said means including a valve having a plurality of interconnecting passageways for, at times, establishing communication between said container, the conduit and the pressure imposing means and at other times for establishing communication between said pressure imposing means and said conduit to the exclusion of said container.

2. A system of means for lubricating machinery comprising, a lubricant container, a conduit connected with the container means for continuously imposing pressure upon the mass of lubricant in the container and for driving said mass through the conduit in a continuous stream, means for imposing additional pressure upon said stream to overcome resistance to the flow thereof through said conduit, and means for regulating the flow of said stream as it passes to the machinery, said means including a valve having a plurality of interconnecting passageways for, at times, establishing communication between said container, the conduit and the pressure imposing means and at other times for establishing communication between the container and the conduit to the exclusion of said pressure imposing means.

3. A system of means for lubricating machinery comprising, a lubricant container, a conduit connected with the container means for continuously imposing pressure upon the mass of lubricant in the container and for driving said mass through the conduit in a continuous stream, means for imposing additional pressure upon said stream to overcome resistance to the flow thereof through said conduit, and means for regulating the flow of said stream as it passes to the machinery, said means including a valve having a plurality of interconnecting passageways for, at times, establishing communication between said container the conduit and the pressure imposing means and at other times for establishing communication between the container and the pressure imposing means to the exclusion of the conduit.

4. A system of means for lubricating machinery and the like comprising, a lubricant container, a conduit connected with the container, means for constantly imposing pressure upon lubricant in said container and for driving the same through the conduit in a substantially continuous stream, means for imposing additional pressure upon said stream to overcome resistance to the flow thereof through said conduit, and means selectively operable to establish communication between said container, the conduit and the pressure imposing means or to establish communication between said conduit and either the pressure imposing means or the container to the exclusion of the other.

CLARK W. PARKER.